(12) United States Patent
Lassl et al.

(10) Patent No.: US 8,517,458 B2
(45) Date of Patent: Aug. 27, 2013

(54) HYDROFORMED AUTOMOTIVE PILLAR

(75) Inventors: Gunnar Lassl, Bohus (SE); Maurizio Roccato, Moncalieri (IT)

(73) Assignee: Volvo Car Corporation, Goeteburg (SE)

( * ) Notice: Subject to any disclaimer, the term of this patent is extended or adjusted under 35 U.S.C. 154(b) by 1891 days.

(21) Appl. No.: 11/530,293

(22) Filed: Sep. 8, 2006

(65) Prior Publication Data

US 2007/0063546 A1    Mar. 22, 2007

(30) Foreign Application Priority Data

Sep. 8, 2005    (EP) ..................................... 05019526

(51) Int. Cl.
    *B62D 25/04*    (2006.01)
(52) U.S. Cl.
    USPC .................................................... 296/193.06
(58) Field of Classification Search
    USPC .................. 296/187.13, 205, 203.03, 193.06,
        296/209, 29, 30; 29/897, 897.2, 897.3, 421.1
    See application file for complete search history.

(56) References Cited

U.S. PATENT DOCUMENTS

| 4,355,844 | A | * | 10/1982 | Fantini Muzzarelli | ....... 296/205 |
| 5,609,374 | A | * | 3/1997 | Sawae et al. | .................. 293/102 |
| 5,839,777 | A | | 11/1998 | Vlahovic | |
| 6,092,865 | A | * | 7/2000 | Jaekel et al. | ................... 296/205 |
| 6,340,203 | B2 | * | 1/2002 | Enomoto et al. | ......... 296/203.02 |
| 6,412,857 | B2 | * | 7/2002 | Jaekel et al. | ................... 296/205 |
| 6,623,067 | B2 | * | 9/2003 | Gabbianelli et al. | .......... 296/205 |
| 2001/0000119 | A1 | | 4/2001 | Jackel et al. | |
| 2001/0002760 | A1 | | 6/2001 | Gabbianelli et al. | |
| 2001/0040392 | A1 | * | 11/2001 | Yoshida | .................... 296/203.02 |
| 2004/0166354 | A1 | | 8/2004 | Schulze | |

FOREIGN PATENT DOCUMENTS

| EP | 0 631 924 A | 1/1995 |
| EP | 0 862 956 A | 9/1998 |
| WO | WO 2004/078563 A | 9/2004 |
| WO | WO 2004078563 A1 * | 9/2004 |
| WO | WO 2005061309 A1 * | 7/2005 |

* cited by examiner

*Primary Examiner* — Glenn Dayoan
*Assistant Examiner* — Sunsurraye Westbrook
(74) *Attorney, Agent, or Firm* — Brooks Kushman P.C.

(57) ABSTRACT

There is provided a hydroformed automotive pillar arrangement operable to provide impact or crash protection in a vehicle. The pillar arrangement includes one or more hydroformed pillars. Each pillar is of unitary elongate construction. Moreover, each pillar is of open or closed substantially tubular cross-section. Furthermore, each pillar has a first end and a second end. Additionally, each pillar is adapted when included in the vehicle to continuously extend at the first end substantially from a socket arrangement coupled to a longitudinal strengthening sill of the vehicle upwardly to the second end.

18 Claims, 5 Drawing Sheets

HYDROFORMED AUTOMOTIVE PILLAR

CROSS-REFERENCE TO RELATED APPLICATIONS

This application is a continuation and claims the benefit of European Patent Application No. 05019526.2 titled "Hydroformed Automotive Pillar" filed Sep. 8, 2006, which is hereby incorporated by reference in its entirety.

TECHNICAL FIELD

The present invention relates to hydroformed automotive pillars, for example to front door-supporting pillars referred to as "A-pillars", to mid-vehicle supporting pillars referred to as "B-pillars", and to rear supporting pillars known as "C-pillars". Moreover, the present invention also relates to methods of including such hydroformed automotive pillars for providing vehicles with enhanced strength.

BACKGROUND OF THE INVENTION

When designing contemporary vehicles, automotive designers are faced with many compromises. One such compromise is weight of automotive components versus their mechanical strength versus their cost of production. In order to try to improve this particular compromise, ultralight steel automotive parts have recently been manufactured by employing hydroforming manufacturing processes. Simply stated, hydroforming employs water or hydraulic fluids at high pressure to provide forces for shaping a given component part. Hydroformed components can be generated either by forming metal sheet or metal tubing.

Hydroforming of tubing is often employed when a complex automotive shape is required. For example, in a hydroforming process, a bent section of seam-welded cold-rolled steel tubing is placed in a closed die set, and then a pressurized fluid is introduced into ends of the tube, reshaping the tube to a confine of a cavity provided by the closed die set.

Hydroforming of sheet steel is contemporarily implemented by two methods. In a first method, a steel sheet is deformed into a female cavity by water under pressure from a pump or by press action to generate a hydroformed component. In a second such method, a steel sheet is deformed by a male punch, which acts against a fluid under pressure. Sheet hydroforming provides a work-hardening effect as the steel sheet is forced against die surfaces by action of fluid pressure. Hydroforming provides aforementioned automotive designers with an opportunity to employ lighter thinner-gauge steels while maintaining component performance.

It is known to fabricate side roof rails, front fender supports and pass-through members of automotive bodies by employing hydroforming processes. For example, in a published international patent application no. PCT/CA98/00962 (WO 99/20516), there is described a hydroformed space frame for a motor vehicle. The space frame is described as comprising first and second hydroformed longitudinally-extending tubular lower side rails. The lower said rails are laterally spaced from one another and are disposed in a generally parallel relation to one another. Moreover, the space frame is further described to include a pair of generally parallel hydroformed tubular upper longitudinal structures, each structure being an integrally-formed structure fixed to an associated one of the lower side rails. Each upper longitudinal structure has a longitudinally-extending portion constructed and arranged to support a roof of the motor vehicle, each longitudinally-extending portion extending longitudinally between an upper end of an A-pillar of the space frame and an upper end of a rearward-most pillar of the space frame. Laterally extending connecting structural connects are disclosed for connecting the lower side rails to one another. Thus, it is known to employ hydroformed components for, in operation, substantially horizontal structural components of space frames for vehicles.

The aforementioned international PCT application concerns a vehicle including a roof structure. In road vehicles devoid of a strengthening roof structure, for example in open-top road vehicles such as cabriolets and soft-top sports vehicles, it is not possible for associated automotive designers to rely on roof structures to provide vehicle occupant protection which represents a technical problem. Conventionally, it has been accepted that such open-top vehicles are potentially not as protected in crash or impact situations in comparison to vehicles including strengthening roof structures. Moreover, it has been appreciated by designers that remaining support pillars and members employed in manufacturing open-top vehicles need to be relatively stronger to provide at least an acceptable degree of protection for vehicle occupants; such strength not only concerns the support pillars themselves but also a manner in which they are incorporated into corresponding vehicles.

SUMMARY OF THE INVENTION

An object of the invention is to provide an improved automotive support pillar arrangement for vehicles.

According to a first aspect of the present invention, a hydroformed automotive pillar of unitary elongate construction, comprises an open or closed substantially tubular cross-section. The pillar further comprises a first end and a second end. And when included in a road vehicle, the pillar is adapted to continuously extend at the first end substantially from a longitudinal strengthening sill of the vehicle upwardly to the second end.

One advantage of the present invention is the increased protection performance of the pillar extending from the sill against impact or crash. Preferably, the hydroformed automotive pillar is adapted to function as a front "A-pillar" for the vehicle. Such application of the pillar is of benefit in that such "A-pillars" are susceptible to experiencing considerable forces in front impact or vehicle roll-over situations. More preferably, the pillar is adapted to function as a front "A-pillar" for the vehicle implemented as an open-top road vehicle. Such application is of benefit in that a lack of roof structure in open-top vehicles potentially results in such "A-pillars" being subject to increased stress in impact or crash situations. Alternatively, the hydroformed automotive pillar is adapted to function as mid-point "B-pillar" or as a rear region "C-pillar" for the vehicle.

In a preferred embodiment, the hydroformed automotive pillar is adapted at its first end to engage into a socket arrangement associated with the sill. The socket arrangement is capable of assisting in convenient manufacture of the vehicle as well as rendering the vehicle better capable of supporting the pillar in impact and crash situations. The hydroformed pillar can be hydroformed from a metal sheet blank or from a tubular blank. More preferably, for convenient manufacture and for achieving desirable mechanical strength characteristics, the pillar is hydroformed from a cold-rolled steel sheet blank or from a cold-rolled steel tubular blank.

Preferably, the hydroformed pillar is of asymmetrical cross-section. The pillar may include a recess along an edge thereof for accommodating in operation an edge of a side window of the vehicle.

In one embodiment as an "A-pillar, the hydroformed automotive pillar comprises in sequence a lower portion including the first end, a middle bend portion and an upper portion including the second end, the automotive pillar having a spatially varying wall thickness therealong with a greatest wall thickness at the middle bend portion relative to the upper portion and the lower portion. Such varying wall thickness is capable of providing a better comprise between a weight of the pillar and its mechanical strength. More preferably, in the hydroformed pillar, the middle bend portion has a relatively thicker wall thickness on a trailing edge thereof relative to a leading edge thereof.

Preferably, in the hydroformed pillar, the upper portion is arranged in operation when included in a vehicle to be backwardly-curved and to provide support for a windscreen and a header of the vehicle. Furthermore, the lower portion has a wall thickness in a range of substantially 3.5 to 5.0 millimeters, the middle bend portion has a wall thickness in a range of substantially 4.0 to 5.7 millimeters, and the upper portion has a wall thickness in a range of substantially 2.7 to 4.0 millimeters.

In an alternative embodiment, the lower portion of the pillar has a wall-thickness/diameter ratio in a range of substantially 7/300 to 1/30, the middle bend portion has a wall-thickness/diameter ratio in a range of substantially 2/75 to 7/450, and the upper portion has a wall thickness/diameter ratio in a range of substantially 8/450 to 2/75.

According to a second aspect of the invention, a socket arrangement adapted to cooperate with a sill of a road vehicle and receive a hydroformed pillar. The socket arrangement comprises an aperture for receiving the pillar and one or more substantially curved load-spreading regions included adjacent to the aperture for coupling forces borne by the pillar in impact or crash situations over a region of the sill. Preferably, the socket arrangement is integral with the sill. Such an implementation is susceptible to simplifying fabrication of the vehicle. In the alternative, the socket arrangement is a component adapted to be attached to the sill.

The socket arrangement may further include a substantially curved load-spreading region adapted in operation to be backwardly or forwardly curved so as to render the socket arrangement operable to support the pillar implemented as an "A-pillar" or a "C-pillar".

In another embodiment, the socket arrangement includes two substantially curved load-spreading regions adapted in operation to be backwardly and forwardly curved so as to render the socket arrangement operable to support the pillar implemented as a "B-pillar" or a "C-pillar". Such substantially curved load-spreading regions are capable of avoiding stress raisers which limit a degree of stress under impact or crash situations that the socket arrangement is capable of bearing.

The socket arrangement can be adapted to be attached to the pillar by at least one of brazing, welding, and the application of one or more fasteners. Such attachment is capable of assisting the pillar to remain engaged with the socket arrangement during impact or crash situations.

According to a third aspect of the invention, a method of providing a vehicle with enhanced strength to resist vehicle a crash such as a roll-over is presented. The method comprises the first step of hydroforming one or more pillars, each pillar being of unitary elongate construction and including a first end and a second end. The second step of the method comprises including the one or more pillars in the vehicle so as to upwardly extend from the first end engaged with a longitudinal sill of the vehicle to the second end.

In one embodiment, the method includes the further step of adapting the sill to include a socket arrangement for receiving each of the one or more pillars. The socket arrangement comprises an aperture for receiving the first end of each of the one or more pillars and one or more substantially curved load-spreading regions included adjacent to the aperture for coupling forces borne by of the one or more pillars in impact or crash situations over a region of the sill.

The method may include a further step of hydroforming the one or more pillars to have a spatially varying wall thickness. More preferably, the method is implemented such that the wall thickness is spatially greatest where the one or more pillars are expected to be subjected to greatest stress during vehicle roll-over.

It will be appreciated that features of the invention are susceptible to being combined in any combination without departing from the scope of the invention as defined by the appended claims.

BRIEF DESCRIPTION OF THE DRAWINGS

By way of example only, embodiments of the invention will now be described with reference to the accompanying drawings wherein.

DETAILED DESCRIPTION OF PREFERRED EMBODIMENTS

Figure 1:
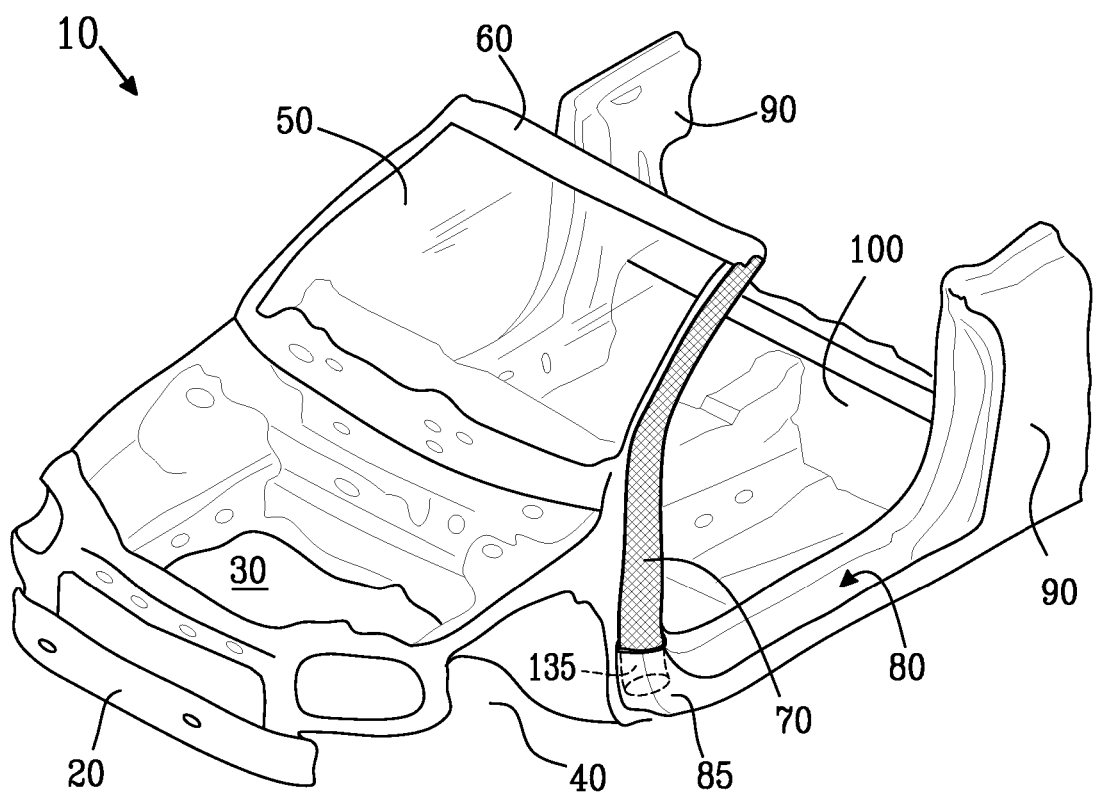
FIG. 1 is a schematic perspective illustration of a front portion of an open-top road vehicle, wherein certain vehicle parts are not illustrated so as to highlight a front substantially vertical pillar, known as an "A-pillar", providing strength to a windscreen and associated top header of the vehicle.

Referring to FIG. 1, there is shown a front portion of an open-top road vehicle indicated generally by 10. The vehicle 10 comprises a front bumper support 20, an engine compartment 30 and a wheel arch 40; however, a corresponding engine and wheel are not shown but nevertheless form a part of the vehicle 10. Moreover, the vehicle 10 includes a windscreen 50 which is supported at its top edge by a header 60. The header 60 is itself supported on two front support pillars known as "A-pillars" which extend continuously substantially from the header 60 and downwardly to horizontal sills 80 on each right and left sides of the vehicle 10. A left-hand front support pillar is illustrated in cross-hatch and is denoted by 70. A right-hand front support pillar (not shown in FIG. 1) is substantially a mirror version of its left-hand front support pillar 70. Each sill 80 is coupled at a front end thereof to its corresponding support pillar 70 and further back therealong to its corresponding rear support pillar denoted by 90; the rear support pillar 90 is also referred to as being a "B"-pillar. Further back, the vehicle 10 optionally includes left- and right-side "C-pillars" prior to a rear luggage compartment of the vehicle 10; the "C-pillar" is conveniently provided with a socket arrangement with forwardly-curved load spreading surfaces as elucidated later. The vehicle 10 further comprises a lateral strengthening member 100 extending between the two rear support pillars 90.

At a front end of the sill 80, there is provided a socket arrangement 85 for receiving a lower end 135 of the support pillar 70. The socket arrangement 85 is not only convenient during assembly of the vehicle 10 but is effective at distributing load more evenly from the support pillar 70 to the sill 80 in crash or impact situations.

Figure 2:
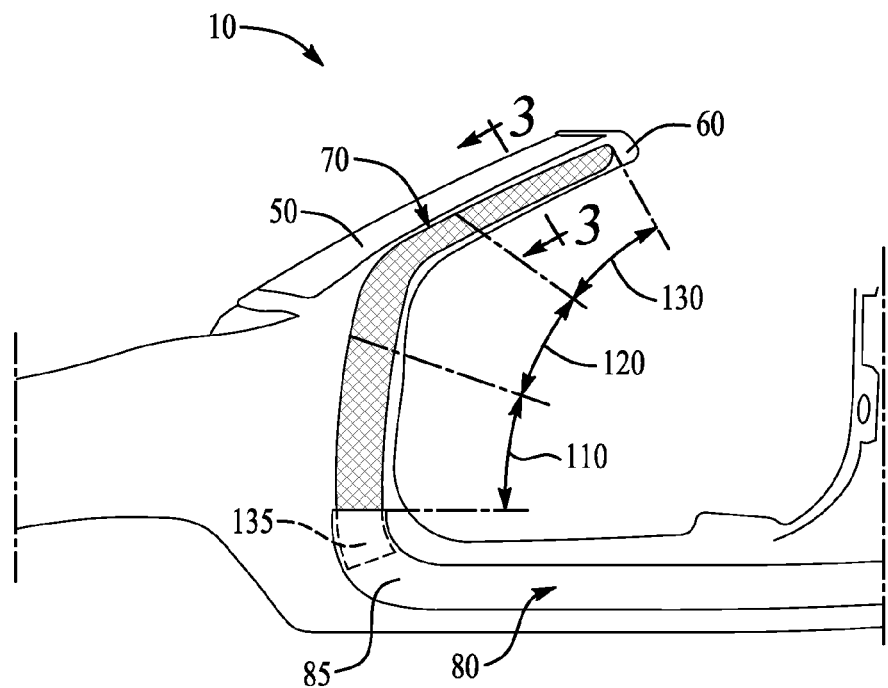
FIG. 2 is a schematic side illustration of a part of the vehicle in FIG. 1, the side illustration further showing a position of the "A-pillar" within the vehicle.

In FIG. 2, the support pillar 70 is shown in enlarged side view and comprises a lower portion 110 whose central longitudinal axis is substantially vertical in orientation in operation, a middle bend portion 120 and an upper portion 130; the upper portion 130 is optionally gently backwardly-curved. The lower portion 110 includes the lower end 135 at an extremity thereof. In practice, the support pillar 70 is optionally retained within the socket arrangement of the sill 80 by at least one of: abutment, welding, brazing, use of fasteners. Such fasteners include, for example, one or more of bolts, rivets, press-studs, screws or similar. In FIG. 2, there is also shown a cross-section 3-3 which is relevant for wall-thickness measurements depicted in FIG. 4.

In a crash or impact situation, for example in a situation wherein the vehicle 10 overturns such that the weight of the vehicle 10 is borne primarily by the header 60, the windscreen 50 itself cannot be relied upon to provide a high degree of support. Thus, the weight of the vehicle 10 in such an overturned state, namely in a vehicle "roll-over" situation, is borne via the header 60 through the two support pillars 70 to the two lateral sills 80 and its associated lateral strengthening member 100. Whereas the header 60 may potentially become deformed in such a crash or impact situation, it is important that the support pillars 70 remain intact to provide protection to occupants of the vehicle 10. In particular, in such an impact of crash situation, the middle bend portion 120 is subject to considerable bending moments causing not only metalwork at a front region on the vehicle 10 to be in tensive stress, but also the sill 80 to be in longitudinal tensive stress. The socket arrangement 85 is designed so as to be able to bear such tensive stress as experienced by the sill 80.

Figure 3:
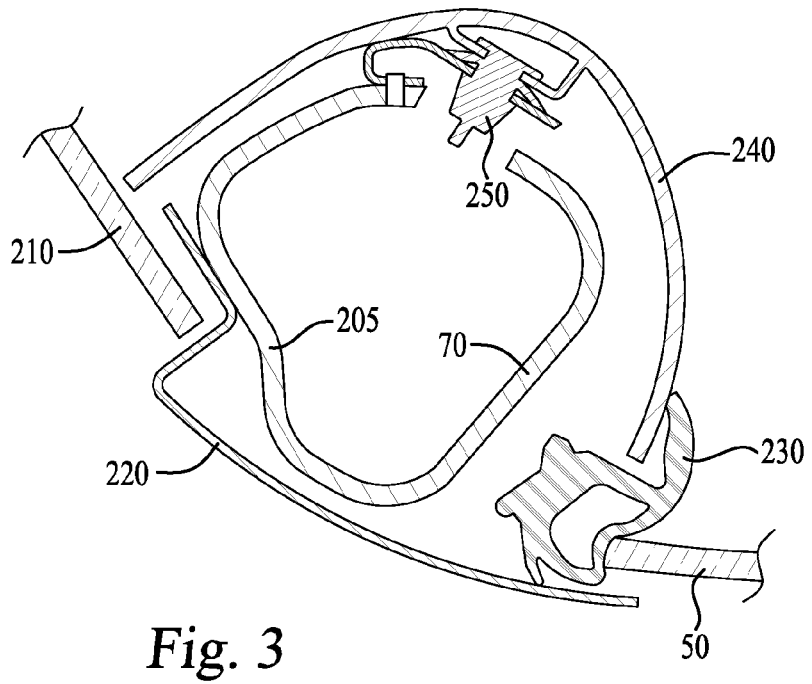
FIG. 3 is an illustration of a section 3-3 through the "A-pillar" of the vehicle shown in FIG. 2.

In order to provide sufficient strength in crash or impact situations, the front support pillars 70 of the vehicle 10 are specially fabricated to be sufficiently strong when continuously extending substantially from the header 60 to the sill 80. In FIG. 3, a cross-section through the axis 3-3 is shown. In the cross-section, there is shown the windscreen 50 and also a side window 210 of a door of the vehicle 10. The cross-section also includes an outer metal skin 220 included primarily for aesthetic purposes and to protect the support pillar 70 from precipitation, for example rain, which could cause rusting of the pillar 70. The cross-section also includes an inner trim 240 which is susceptible to being implemented as a metal sheet or plastics material part. A rubber or similar elastic material surround 230 is included to provide a weather seal for the windscreen 50 to the outer metal skin 220. Plastics material rivets or similar types of fasteners as denoted by 250 are included at intervals along the pillar 70 to retain the inner trim 240 onto the pillar 70. The pillar 70 is hydroformed from metal sheet or metal tubing on account of its relatively complex geometrical shape; when hydroformed from metal tubing, the pillar 70 is said to be of "closed" form; alternatively, when hydroformed from metal sheet, the pillar 70 is referred to as being of "open" form and may in such case include a longitudinal slot along at least part of its length on account of the metal sheet being curved into a substantially tubular format. The metal sheet or metal tubing is beneficially cold-rolled steel, although other materials such as stainless steel, titanium, titanium alloy, aluminum, duralloy and aluminum alloy can be used for fabricating the pillar 70. The pillar 70 can, for example, be recessed along its edge, defining a recess 205, to provide a space for accommodating the side window 210 and the outer metal skin 220 as illustrated. Moreover, the pillar 70 optionally has an asymmetrical cross-section as illustrated, although it can be alternatively rendered symmetrical in cross-section.

Figure 4:
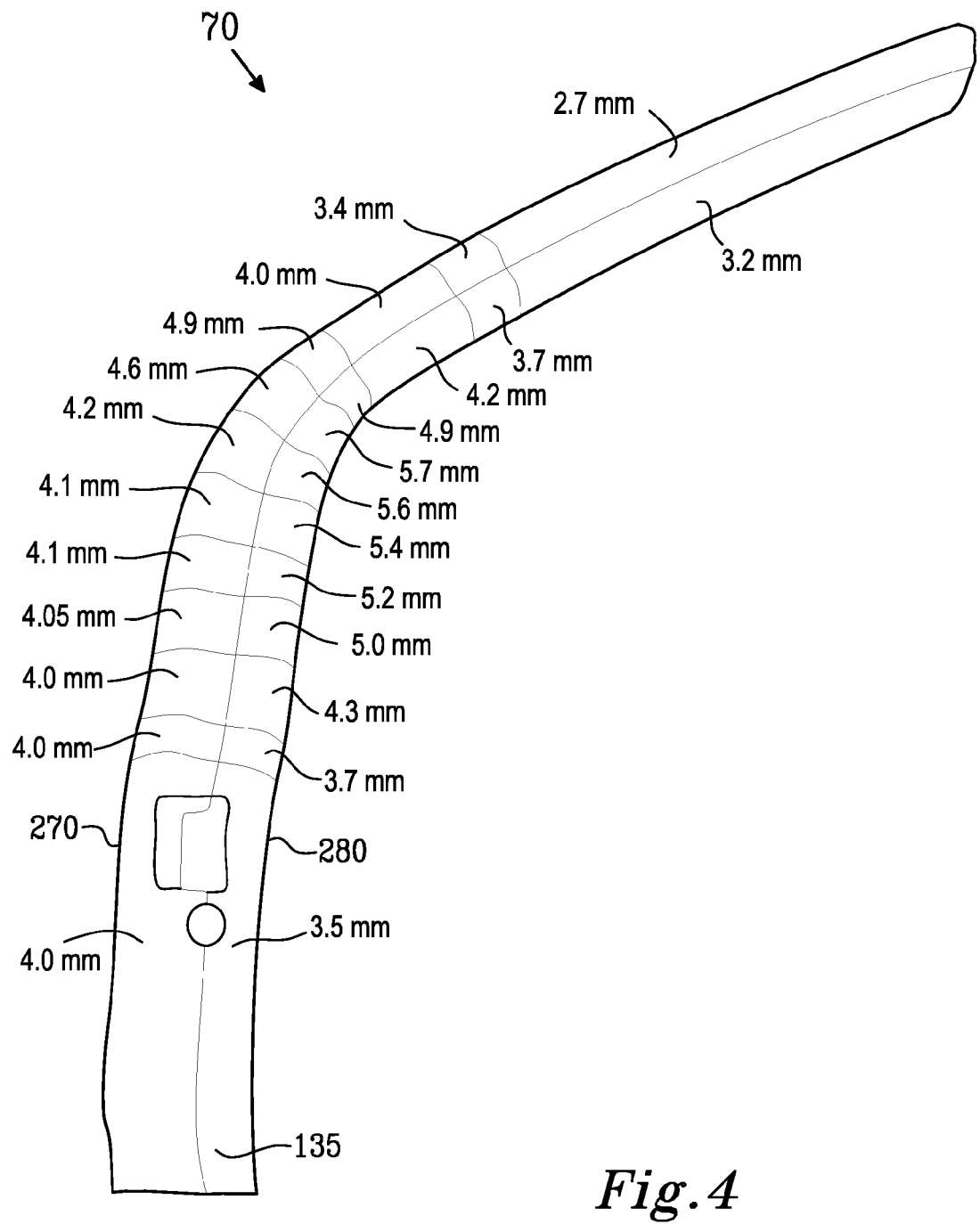
FIG. 4 is a side view of the "A-pillar" of the vehicle in FIG. 1, wherein variations in wall thickness along the "A-pillar" are shown, especially in a region of the "A-pillar" most subject to mechanical stress under potential impact or crash situations.

The pillar 70 not only is required to be sufficiently strong in operation, for example in a crash or impact situation, but also not to add excessively to weight of the vehicle 10 as excess weight can affect cost of manufacturing the vehicle 10, can affect the vehicle's 10 handling performance such as acceleration, and can have implications for a suspension mechanism of the vehicle 10. In order to impart each pillar 70 of the vehicle 10 with best operative performance, wall thickness of the pillar 70 is rendered spatially variable in a manner as depicted in FIG. 4 for the pillar fabricated from cold-rolled steel. The wall thickness varies spatially in a continuous manner not only along the pillar 70 but also around the pillar 70 when fabricated from a tubular blank, but is depicted in FIG. 4 as average thickness over spatial regions of the pillar 70 as shown for convenience of presentation. For reference, a leading edge of the pillar 70 is denoted by 270 in FIG. 4 and a trailing edge thereof by 280. Wall thickness data included in FIG. 4 are in units of millimeters and are in respect of points of intersection of the axis 3-3 with the pillar 70 as depicted in FIG. 3. Such spatially varying thickness is achieved either by appropriately adjusting dimensions of a tube blank or sheet blank to be subsequently hydroformed to form the pillar 70, or by machining the pillar 70 after hydroforming. Such adjustment of dimensions can be achieved by one or more of milling, grinding, selective rolling, or by selective adjustment of the hydroforming process itself such as employing differential pressure profiles during hydroforming. Hydroforming of the pillar 70 is of benefit in that it enables a complex thickness profile as illustrated to be achieved in mass production at acceptable cost. It is seen from FIG. 4 that the pillar 70 is fabricated to have a greatest wall thickness, for example up to 5.7 millimeters thickness, at a lower portion of an inside exterior edge of the middle bend portion 120; when the pillar 70 has a nominal diameter of 150 mm, this corresponds to a wall-thickness/diameter ratio of substantially 3/50. Moreover, the middle bend portion 120 has a wall thickness which is generally greater than that of the lower portion 110 and especially the upper portion 130. A transition between the middle bend portion 120 and the upper portion 130 is on an outside exterior edge thereof of greatest wall thickness of substantially 4.9 millimeters as illustrated; when the pillar 70 has a nominal diameter of 150 mm, this corresponds to a wall-thickness/diameter ratio of 1/30. Thus, whereas, the lower portion 110 has a wall thickness of substantially 4 millimeters, the middle bend portion 120 has a wall thickness of substantially 5 to 6 millimeters, and the upper portion 130 has a wall thickness of substantially 3 millimeters; a thinnest wall thickness is utilized in the upper portion 130. In terms of a ratio of diameter of the pillar 70 to its wall thickness, the diameter being taken to be substantially 150 mm, the lower portion 110 has a wall-thickness/diameter ratio of substantially 2/75, the middle bend portion 120 has a wall-thickness/ diameter ratio of substantially 11/300, and the upper portion has a wall-thickness/diameter ratio of substantially 1/50. Wall thicknesses presented in FIG. 4 are found by the inventors, by applying a reduction process in deriving such wall thicknesses, to provide optimal protection against vehicle roll-over in crash or impact situations in which the vehicle 10 overturns. However, it will be appreciated that optimal wall thicknesses will be a function of nominal diameter of the pillar 70 and also its overall length. The pillar 70 preferably has a length in a range of 1.3 to 2 meters. Moreover, it preferably has a nominal diameter in a range of 5 cm to 25 cm, more optionally substantially 15 cm.

Figure 5:
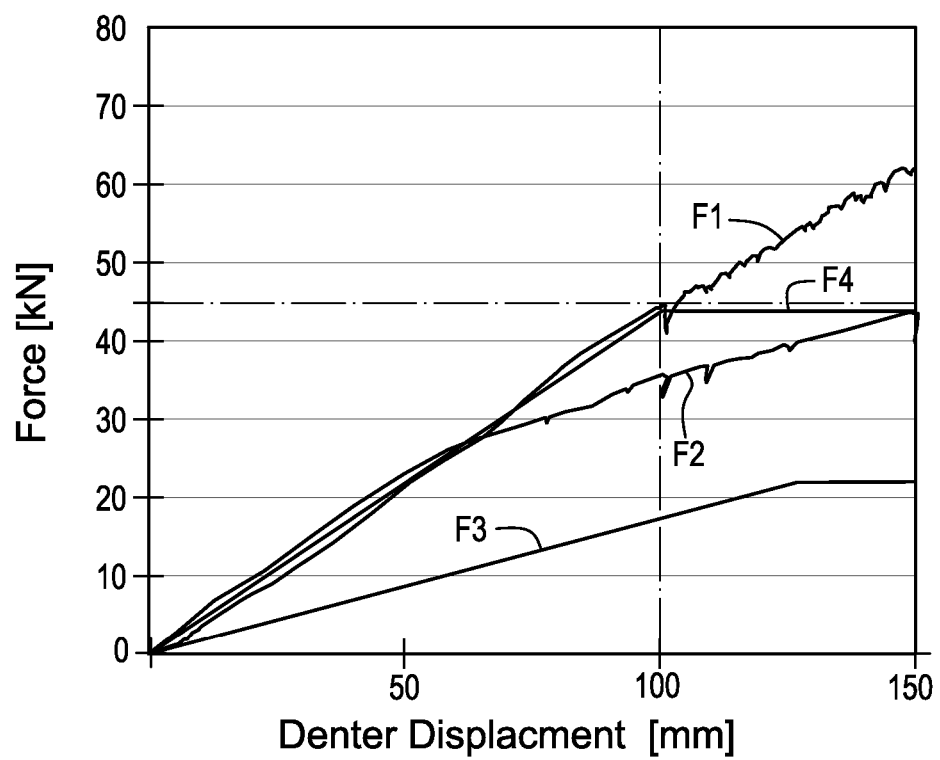
FIG. 5 is a graph providing mechanical strength characteristics of the "A-pillar" illustrating in FIGS. 2 and 4.

In FIG. 5, performance results for the pillars 70 in the vehicle 10 are presented. There is shown a graph comprising an abscissa axis denoting Denter displacement at an upper region of the pillar 70 in units of millimeters in response to applied force as denoted along an ordinate axis; the ordinate axis has units of kiloNewtons (kN). There are shown a series of curves F1 to F4 from experiments and simulations which indicate that the pillar 70 undergoes a displacement of substantially 100 millimeters when a force of 45 kN is applied to the pillar 70. Such a displacement performance is susceptible to providing occupants of the vehicle 10 with a high degree of protection from being injured when the vehicle 10 is in operation and subjected to a crash situation.

As elucidated briefly in the foregoing, the pillar 70 is susceptible to being hydroformed from a range of potential metals and metal alloys. Although cold-rolled steel and aluminum are described in the foregoing, alternative metals such as duralloy, titanium and stainless steel can be employed consistent with being sufficiently ductile to be susceptible to being hydroformed.

The performance results depicted in FIG. 5 are also dependent upon the pillar 70 being able to couple stresses experienced at the pillar 70 especially during crash or impact to other regions of the vehicle 10. Such coupling of stress is pertinent to the end 135 of the pillar 70 whereat it is accommodated in the socket arrangement 85. In order to cope with impact or crash stresses, the socket arrangement 85 is provide with curved surfaces in regions thereof progressing away from where the pillar 70 is received. For example, FIGS. 6a-b concern a socket arrangement indicated generally by 300 for receiving the B-pillar 70b at a mid-point along the sill 80, for example in a situation of a "B-pillar". The socket arrangement 300 includes an interface member including an aperture for receiving the end 135 of the pillar 70b with first and second curved load bearing regions 310, 320 respectively leading to the sill 80. A benefit of employing such curved load bearing regions 310, 320 is that abrupt stress-raising points are not introduced, such points potentially susceptible to give rise to a concentration of stress and hence susceptible to local fracture in crash or impact situations. The interface member is optionally integral with the sill 80. Alternatively, the interface member can be attached to the sill 80 by one or more fasteners 325, for example bolts, screws, rivets or similar. Yet alternatively, the interface member can be welded or brazed to the sill 80. Optionally, the pillar 70b is secured to the aperture of the interface member, for example by way of fasteners or by seam or spot welding, or seam or spot brazing around a peripheral edge of the aforesaid aperture.

Figure 6A:
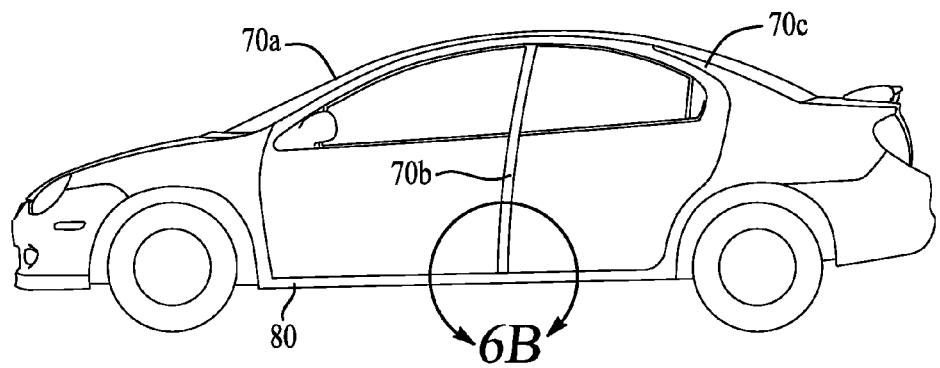
FIGS. 6a-b is a sketch diagram illustrating an arrangement for accommodating a "B-pillar", for example implemented as a hydroformed pillar, at its lower end in a socket arrangement associated with a sill of the vehicle.
Figure 6B:
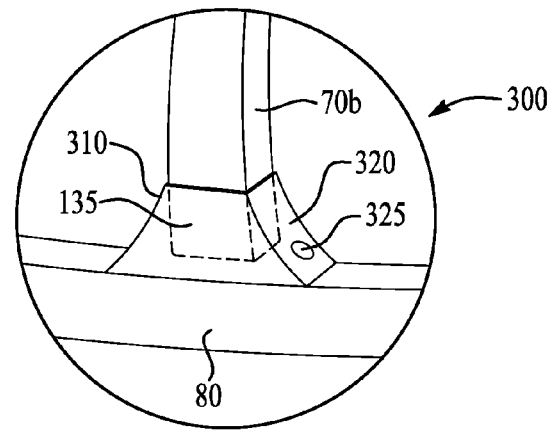
Figure 7A:
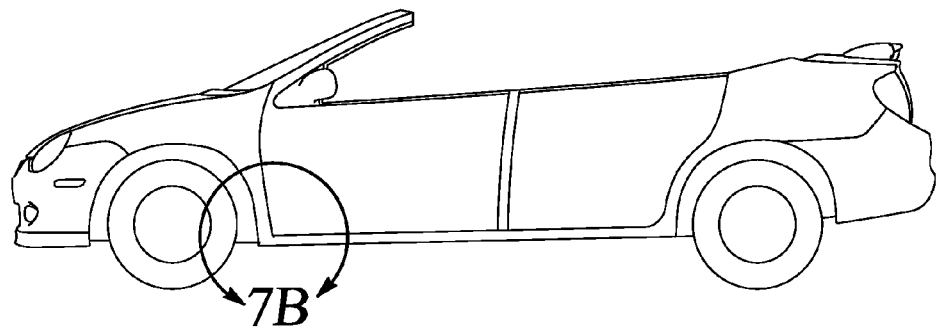
FIGS. 7a-b is a sketch diagram illustrating an arrangement for accommodating an "A-pillar", for example implemented as a hydroformed pillar, at its lower end in a socket arrangement associated with a sill of the vehicle.
Figure 7B:
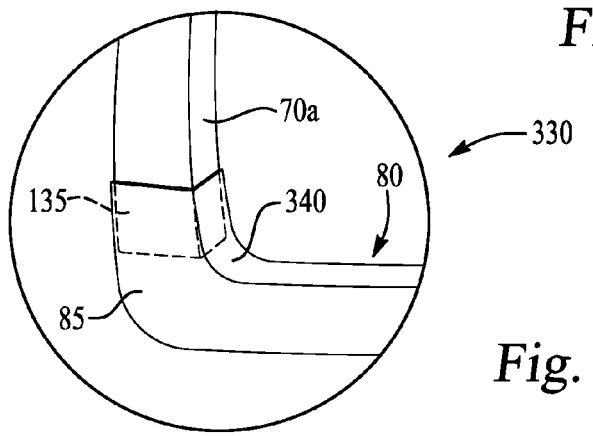

In FIGS. 7a-b, there is shown a socket arrangement indicated generally by 330 for receiving the pillar 70a at a front end of the sill 80, for example in a situation of an "A-pillar" or potentially a "C-pillar" 70c (as shown in FIG. 6a). The socket arrangement 330 includes an interface member including an aperture for receiving the end 135 of the pillar 70a with a trailing curved load bearing region 340 leading to the sill 80. A benefit of employing such a curved load bearing region 340 is that abrupt stress-raising points are not introduced, such points potentially susceptible to giving rise to a concentration of stress and hence susceptible to local fracture in crash or impact situations. The interface member is shown to be integral with the sill 80; alternatively, it can be an end component added to the sill 80 in which case the interface member can be attached to the sill 80 by one or more fasteners, for example bolts, screws, rivets or similar. Yet alternatively, the interface member can be welded or brazed to the sill 80. Optionally, the pillar 70a is secured to the aperture of the interface member, for example by way of fasteners or by seam or spot welding, or seam or spot brazing around a peripheral edge of the aforesaid aperture.

The socket arrangements 300, 340 are also susceptible to being employed to receive rear "C-pillars", for example hydroformed rear pillars, 70c as shown in FIG. 6a. "C-pillars" are, for example, employed to support rear windows of corresponding vehicles and for providing support to rear doors of a vehicle when four doors are included therein.

The socket arrangements 330, 340 can be fabricated from at least one of metal, plastics material, composite material. For example, the socket arrangements 330, 340 are conveniently fabricated from appropriate bent and formed sheet metal, for example sheet steel. Alternatively, the socket arrangements 330, 340 can be cast components. Conveniently, the socket arrangements are of tapered form as illustrated.

It will be appreciated that embodiments of the invention described in the foregoing are susceptible to being modified without departing from the scope of the invention as defined by the accompanying claims.

Numerals included within parentheses in the accompanying claims are included to assist appreciation of subject matter claimed in the accompanying claims and are not intended to limit scope of the claims.

Expressions such as "comprise", "include", "consist of", "incorporate", "have" and "is" are intended to be construed non-exclusively, namely such expressions do not exclude other components, items or elements being present which are not explicitly described or disclosed. Reference to the plural is to be construed also to refer to the singular and vice versa.

We claim:

1. A hydroformed automotive pillar of unitary elongate construction being adapted for a road vehicle having a longitudinal strengthening sill, the pillar comprising:
    an open tubular cross-section, the pillar having a first end and a second end;
    wherein the pillar is adapted to continuously extend at the first end substantially from the longitudinal strengthening sill of the vehicle upwardly to the second end;
    wherein the pillar includes a varying wall thickness along a length of the pillar.

2. A hydroformed automotive pillar as claimed in claim 1, the pillar being adapted to function as an A-pillar for the vehicle.

3. A hydroformed pillar as claimed in claim 2, wherein the vehicle is as an open-top road vehicle.

4. A hydroformed automotive pillar as claimed in claim 1, the pillar being adapted to function as B-pillar for the vehicle.

5. A hydroformed automotive pillar as claimed in claim 1, the pillar being adapted to function as a C-pillar for the vehicle.

6. A hydroformed automotive pillar as claimed in claim 1, wherein the pillar is adapted at a first end to engage a socket arrangement associated with the sill.

7. A hydroformed pillar as claimed in claim 1, wherein the pillar is hydroformed from a metal sheet blank.

8. A hydroformed pillar as claimed in claim 1, wherein the pillar is hydroformed from a cold-rolled steel sheet blank.

9. A hydroformed pillar as claimed in claim 1, wherein the pillar comprises an asymmetrical cross-section.

10. A hydroformed pillar as claimed in claim 9, wherein the pillar includes a recess along an edge thereof for accommodating a window of the vehicle.

11. A hydroformed automotive pillar as claimed in claim 1, wherein the greatest wall thickness in the pillar is within a middle bend portion of the pillar.

12. A hydroformed pillar as claimed in claim 1, wherein a middle bend portion has a relatively thicker wall thickness on a trailing edge thereof relative to a leading edge thereof.

13. A hydroformed pillar as claimed in claim 1, wherein an upper portion is arranged to be backwardly-curved and to provide support for a windscreen and a header of the vehicle.

14. A hydroformed pillar as claimed in claim 1, wherein a lower portion of the pillar has a wall thickness in a range of 3.5 to 5.0 millimeters;
   wherein a middle bend portion of the pillar has a wall thickness in a range of 4.0 to 5.7 millimeters; and
   wherein an upper portion of the pillar has a wall thickness in a range of 2.7 to 4.0 millimeters.

15. A hydroformed pillar as claimed in claim 1, wherein a lower portion of the pillar has a wall-thickness/diameter ratio in a range of 7/300 to 1/30;
   wherein a middle bend portion of the pillar has a wall-thickness/diameter ratio in a range of 2/75 to 7/450; and
   wherein a upper portion of the pillar has a wall-thickness/diameter ratio in a range of 8/450 to 2/75.

16. A hydroformed pillar for an automobile, comprising:
   an open tubular cross-section;
   a lower portion having a first wall thickness;
   a middle portion having a second wall thickness; and
   an upper portion having a third wall thickness;
   wherein at least one of the first wall thickness, second wall thickness or third wall thickness is different from at least one of the other wall thicknesses.

17. The pillar of claim 16, wherein the pillar is adapted to function as the A-pillar, B-pillar or C-pillar of a vehicle.

18. The pillar of claim 16, wherein the greatest wall thickness in the pillar is in the middle portion.

* * * * *